United States Patent [19]
Matsui et al.

[11] Patent Number: 5,294,278
[45] Date of Patent: Mar. 15, 1994

[54] PROCESS FOR THE APPLICATION OF PROTECTIVE SELF-ADHESIVE FILM

[75] Inventors: Komaharu Matsui; Takeshi Eda; Mitsuo Wakimoto, all of Hiratsuka, Japan

[73] Assignee: Kansai Paint Co., Ltd., Amagasaki, Japan

[21] Appl. No.: 21,037

[22] Filed: Feb. 23, 1993

[30] Foreign Application Priority Data

Feb. 26, 1992 [JP] Japan .................................. 4-076219
Feb. 28, 1992 [JP] Japan .................................. 4-078985

[51] Int. Cl.$^5$ ...................... B32B 31/00; B60J 11/00; B60R 27/00
[52] U.S. Cl. .................... 156/248; 156/247; 156/253; 156/267; 156/257; 428/31; 428/41; 150/166
[58] Field of Search ............... 156/247, 248, 267, 252, 156/253, 257, 71; 428/31, 41, 43; 296/136; 150/166; 160/370.2

[56] References Cited

U.S. PATENT DOCUMENTS

| | | | |
|---|---|---|---|
| 2,408,461 | 7/1936 | Mosgoffian | 296/136 X |
| 3,316,012 | 4/1967 | Thier | 296/136 |
| 3,909,331 | 9/1975 | Cohen | 156/253 |
| 4,430,137 | 2/1984 | Jones | 156/247 |
| 4,550,048 | 10/1985 | Nakagawa | 156/252 X |
| 4,642,925 | 2/1987 | Thompson | 428/41 X |
| 4,793,884 | 12/1988 | Horikiri | 428/41 X |
| 4,911,965 | 3/1990 | Kraus | 428/43 |
| 5,079,059 | 1/1992 | Wyslotsky | 428/41 X |
| 5,127,974 | 7/1992 | Tomiyama | 156/247 X |
| 5,209,546 | 5/1993 | Slaugh | 296/136 |

*Primary Examiner*—David A. Simmons
*Assistant Examiner*—Charles Rainwater
*Attorney, Agent, or Firm*—Fisher, Christen & Sabol

[57] ABSTRACT

A process for applying a protective self-adhesive film onto a coat-finished product having an object unnecessary to be protected by the protective self-adhesive film, which process comprises (1) the following steps: applying a perforated self-adhesive film (a) having a perforation onto the surface of the coating of the coat-finished product so that an area occupied by the object may be positioned within the perforation, applying a protective self-adhesive film onto the object, the perforated self-adhesive film (a) and such a part of the coating of the coat-finished product as not to be covered with the perforated self-adhesive film (a), and removing an unnecessary portion of the protective self-adhesive film over the perforation; or (2) the following steps: applying the protective self-adhesive film onto the object and a coating of the coat-finished product, cutting out such an unnecessary portion of the protective self-adhesive film as positioned over the area occupied by the object by use of a cylindrical cutting device comprising a ring-shaped cutter blade and a cylindrical pressing means, preferably further comprising a ribbon heater to heat the cutter blade to press and adhere the remaining portion of the protective self-adhesive film around the onto the coating of the coat-finished product, and removing the cut unnecessary portion of the protective self-adhesive film by suction.

4 Claims, 3 Drawing Sheets

PROCESS FOR THE APPLICATION OF PROTECTIVE SELF-ADHESIVE FILM

BACKGROUND OF THE INVENTION (1) Field of the Invention

The present invention relates to a process for applying a protective self-adhesive film, and more particularly to a process for applying a protective self-adhesive film onto a coat-finished product.

(2) Description of the Prior Art

Transport of a coat-finished product to users, or temporary indoor or outdoor storage of the coat-finished product causes defects such as marks, stains, discoloration, contamination and the like on the surface of the coat-finished product due to influences of clouds of sand, iron powder, rain, particularly acid rain, salts, sunlight, etc. For the purpose of overcoming the above defects, a process for applying a protective self-adhesive film onto the surface of the coat-finished product to temporarily protect the surface of the coat-finished product is known in the art.

The application of the above protective self-adhesive film is carried out by a process which comprises uniformly pressing the film onto the surface of the coat-finished product such as a bonnet of an automobile by use of a roller, squeezee or the like, and cutting out an unnecessary portion of the protective self-adhesive film over an area occupied by an object unnecessary to be protected by the protective self-adhesive film, for example, a projecting portion of a washer nozzle on the bonnet of the automobile, by use of a cutter knife.

However, the above process in the art had such disadvantages that cutting out the protective self-adhesive film with the cutter knife in the application of the protective self-adhesive film may make cuts onto the coating of the coat-finished product, resulting in reducing commercial value and durability of the coating.

SUMMARY OF THE INVENTION

It is an object of the present invention to provide a process for applying a temporarily coating-protective self-adhesive film (hereinafter may be referred to as a protective self-adhesive film) onto a coat-finished product having an object unnecessary to be protected by the protective self-adhesive film, which process is capable of removing an unnecessary portion of the protective self-adhesive film over an area occupied by the object unnecessary to be protected by the protective self-adhesive film without making cuts onto the coating of the coat-finished product on cutting out the unnecessary portion of the protective self-adhesive film, capable of greatly reducing the working time to remove the unnecessary portion of the protective self-adhesive film, and capable of preventing pollutants from contacting with the coating of the coat-finished product to effectively protect the coating of the coat-finished product with good durability.

In a first aspect, the present invention provides a process for applying a protective self-adhesive film onto a coat-finished product having an object unnecessary to be protected by the protective self-adhesive film, which process comprises the following steps: applying a perforated self-adhesive film (a) having a perforation onto the surface of the coating of the coat-finished product so that an area occupied by the object unnecessary to be protected may be positioned within the perforation, applying a protective self-adhesive film onto the object, the perforated self-adhesive film (a) and such a part of the coating of the coat-finished product as not to be covered with the perforated self-adhesive film (a), and removing an unnecessary portion of the protective self-adhesive film over the perforation.

In a second aspect the present invention provides a process for applying a protective self-adhesive film onto a coat-finished product having an object unnecessary to be protected by the protective self-adhesive film, which process comprises the following steps: applying the protective self-adhesive film onto the object and a coating of the coat-finished product, cutting out such an unnecessary portion of the protective self-adhesive film as positioned over the area occupied by the object by use of a cylindrical cutting device comprising a ring-shaped cutter blade and a cylindrical pressing means, preferably further comprising a ribbon heater to heat the cutter blade to a predetermined temperature to press and adhere the remaining portion of the protective self-adhesive film around the object onto the coating of the coat-finished product, and removing the cut unnecessary portion of the protective self-adhesive film by suction.

BRIEF DESCRIPTION OF THE DRAWINGS

In FIGS. 1-5, 1 is a coating of an automobile bonnet as a coat-finished product, 2 is a projecting washer nozzle as an object unnecessary to be protected, 3 is a perforated self-adhesive film, and 4 is a protective self-adhesive film.

In FIGS. 6-9, 11 is a steel material, 12 is a coating, 13 is a projecting washer nozzle as an object unnecessary to be protected on an automobile bonnet as a coat-finished product, 14 is a protective self-adhesive film, 15 is a pressing means, 16 is a cutter blade, 17 is a heater and 18 is a cut unnecessary portion of the protective self-adhesive film. The arrow mark shows a direction, in which the cut unnecessary portion of the protective self-adhesive film is removed by suction.

DETAILED DESCRIPTION OF THE INVENTION

The coat-finished product used in the present invention is not particularly restricted, but may preferably include an automobile bonnet having two projecting washer nozzles thereon.

The process according to the first aspect of the present invention may be explained by an example in the case of an automobile bonnet as the coat-finished product with reference to FIGS. 1-5 hereinbelow.

Figure 1:
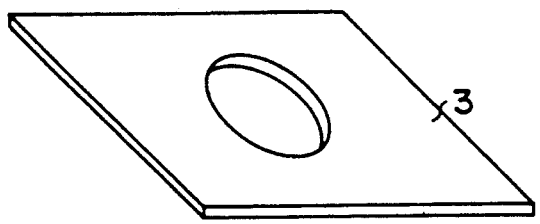
FIG. 1 is a schematic view of a perforated self-adhesive film (a) used in the first aspect of the present invention.

FIG. 1 shows a schematic view of a perforated self-adhesive film (a). The film (a) comprises a substrate and a pressure-sensitive adhesive layer as the essential elements.

The substrate constituting the perforated self-adhesive film (a) is not particularly restricted, but may include films or sheets comprising fibrous materials such as paper, fabrics, nonwoven fabric and the like, ones comprising plastics such as polyvinyl chloride, polyethylene, polypropylene, polyester and the like, and ones comprising metals such as aluminium and the like.

The ingredient constituting the pressure-sensitive adhesive layer is not particularly restricted, but may include conventionally used ones such as vinyl resin, polyester resin, alkyd resin, silicone resin, natural rubber resin, synthetic rubber resin, modified resins thereof, and the like.

The film thickness of the perforated self-adhesive film (a) is preferably greater than that of the following protective self-adhesive film (b), and is in the range of about 40 $\mu$m to 500 $\mu$m, preferably 45 to 300 $\mu$M. When the thickness of the film (a) is less than 40 $\mu$m, a removal workability of the film (a) is reduced. When more than 500 $\mu$m, air bubbles may be entrapped by the coating of the coat-finished product, an outside wall of the film (a) and the protective self-adhesive film (b) around the outside wall of the film (a) on applying the film (b) onto the film (a), and entrapped air bubbles may result adverse effects on the coating of the coat-finished product.

Figure 2:
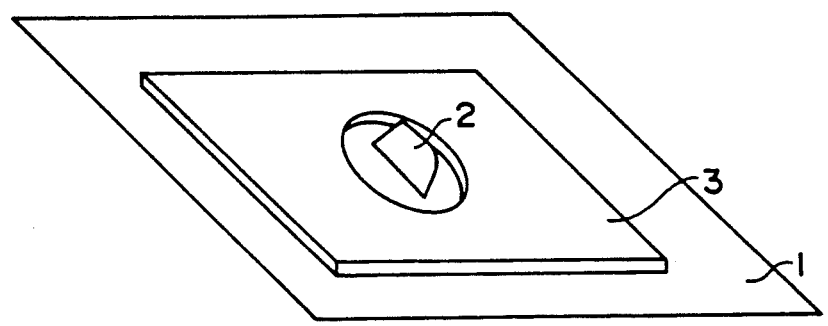
FIG. 2 is a schematic view for explaining a first step of an example of the first aspect in the process of the present invention.

FIG. 2 is a schematic view for explaining a first step of the process according to the first aspect of the present invention.

In FIG. 2, a perforated self-adhesive film (a) 3 having a perforation is applied onto the surface of a coating 1 of an automobile bonnet so that an area occupied by a washer nozzle 2 unnecessary to be protected may be positioned within the perforation.

Figure 3:
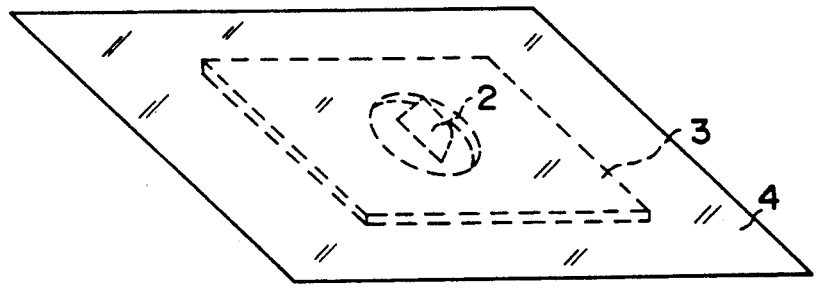
FIG. 3 is a schematic view for explaining a second step of an example of the first aspect in the process of the present invention.

FIG. 3 is a schematic view for explaining a second step of the process according to the first aspect of the present invention. In FIG. 3, a protective self-adhesive film (b) 4 is applied onto the washer nozzle 2, the perforated self-adhesive film (a) 3 and such a part of the coating 1 of the automobile bonnet as not to be covered with the perforated self-adhesive film (a) 3. The protective self-adhesive film (b) 4 comprises a substrate and a pressure-sensitive adhesive layer as the essential element, and may include the conventionally used pressure-sensitive self-adhesive film. The protective self-adhesive film (b) 4 is applied in such a manner that the pressure-sensitive adhesive layer is brought into contact with the washer nozzle 2, the perforated self-adhesive film (a) 3 and the above part of the coating 1 of the automobile bonnet, followed by pressing in the direction from the surface of the substrate by use of a device such as a roller or a squeezee to cover them.

Such a part of the protective self-adhesive film (b) 4 as to be applied onto the projecting washer nozzle 2 is protruded in the form of a tent. The thickness of the film (b) is in the range of 30 to 50 $\mu$g m, preferably 40 to 300 $\mu$m. When the film thickness is less than 30 $\mu$m, the film (b) may not show a satisfactory function as the protective film and may show poor removal workability. When more than 500 $\mu$m, cost becomes high and application workability onto the bent surface of the coating of the coat-finished product or onto the surface of the film (a) becomes poor.

Figure 4:
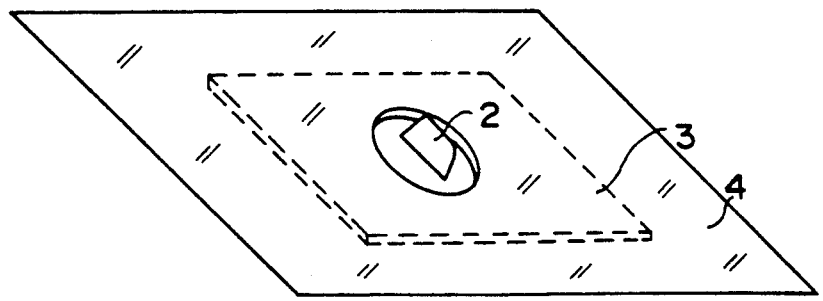
FIG. 4 is a schematic view of explaining a third step of an example of the first aspect in the process of the present invention.

FIG. 4 is a schematic view for explaining a third step of the process according to the first aspect of the present invention.

In FIG. 4, an unnecessary portion of the protective self-adhesive film (b) 4 over the perforation is removed. Removal of the above unnecessary portion may be carried out by cutting out by use of a cutting device such as a cutter knife so that the projecting washer nozzle may appear. The cutter knife used may preferably include commercially available ones such as a safety magic cutter which is capable of cutting only one sheet of paper or film from papers or films in layers, because use of the safety magic cutter prevent the coating of the automobile bonnet from being cut. After the completion of cutting out the above unnecessary portion of the protective self-adhesive film, a remaining portion of the protective self-adhesive film is preferably pressed and adhered around the cut onto the coating of the automobile bonnet so that pollutants such as rain water may not penetrate between the cut and the above coating.

Figure 5:
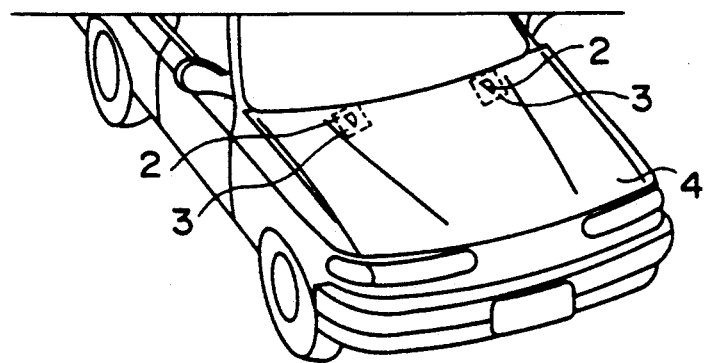
FIG. 5 is a schematic view showing an automobile bonnet which has been subjected to a process according to the first aspect of the present invention.

FIG. 5 is a schematic views showing an automobile bonnet which has been subjected to a process according to the first aspect of the present invention.

In FIG. 5, 2 is a projecting washer nozzle, 3 is a perforated self-adhesive film, and 4 is a protective self-adhesive film covering two of the perforated self-adhesive film 2 and such a part of the coating of the automobile bonnet as not to be covered with two of perforated self-adhesive film 2.

The process according to the second aspect of the present invention may be explained by an example in the case of an automobile bonnet as the coat-finished product with reference to FIGS. 6-9 hereinbelow.

Figure 6:
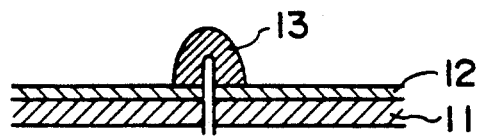
FIGS. 6-9 are partial sectional views for explaining respective steps of an example of a process according to the second aspect of the present invention.

FIG. 6 is a partial sectional view of an automobile bonnet having a projecting washer nozzle. In FIG. 6, 11 is a steel material, 12 is a coating and 13 is a projecting washer nozzle.

Figure 7:
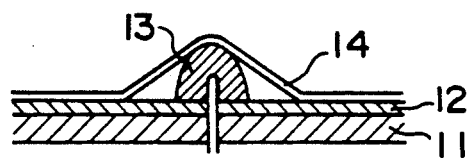

FIG. 7 is a partial sectional view of an automobile bonnet having a projecting washer nozzle for explaining a first step of the process according to the second aspect of the present invention. In FIG. 7, a protective self-adhesive film 14 is applied onto a projecting washer nozzle 13 and a coating 12 of the automobile bonnet. The protective self-adhesive film is the same as used in the process according to the first aspect of the present invention. A film thickness of the protective self-adhesive film 14 is in the range of 30 to 500 $\mu$m, preferably about 40 to 30 $\mu$m. When the film thickness of the protective self-adhesive film is less than 30 $\mu$m, the protective self-adhesive film may not show a satisfactory function as the protective film and may show poor removal workability. When more than 500 $\mu$m, cost becomes high and cutting of the film becomes undesirably difficult.

The protective self-adhesive film 14 may be the same as the protective self-adhesive film (b) 4 in FIG. 3. The protective self-adhesive film 14 is applied in such a manner that a pressure-sensitive adhesive layer is brought into contact with the washer nozzle 13 and a coating 12 of the automobile bonnet, followed by pressing in the direction from the surface of a substrate constituting the protective self-adhesive film 14 by use of a device such as a roller or a squeezee to cover them. Such a part of the protective self-adhesive film 14 as to be applied onto the projecting washer nozzle 13 is protruded in the form of a tent.

Figure 8:
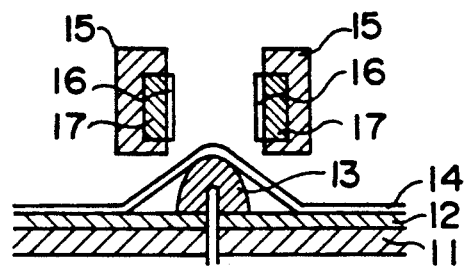
Figure 9:
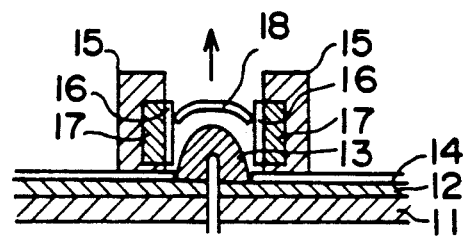

FIGS. 8 and 9 are a partial sectional view for explaining a preferable embodiment of a second step of the process according to the second aspect of the present invention. In FIGS. 8 and 9, such an unnecessary portion of the protective self-adhesive film 14 as positioned over the area occupied by the projecting washer nozzle 13 is cut out by use of a cylindrical cutting device comprising a ring-shaped cutter blade 16 and a cylindrical pressing means 15, preferably further comprising a ribbon heater 17 to heat the cutter blade 16 to a predetermined temperature to press and adhere the remaining portion of the protective self-adhesive film 14 around the washer nozzle 13 onto the coating 12 of the automobile bonnet. A material constituting the pressing means 15 may preferably include an elastic heat insulating material such as rubber. The front end of the pressing means 15 is preferably projected beyond the front end of the cutter blade 16 in the cutting direction so that the coating 12 may not be cut by the cutter blade 16 and that the remaining portion of the protective self-adhesive film 14 around the washer nozzle 13 may be pressed and effectively adhered onto the coating 12 of the automobile bonnet.

FIG. 9 is a partial sectional view for explaining a third step of the process according to the second aspect of the present invention. In FIG. 9, a cut unnecessary portion 18 of the protective self-adhesive film 14 is removed by suction using a vacuum hose in the direction shown by an arrow mark.

On cutting out the protective self-adhesive film 14, the temperature of the cutter blade 16 may be room temperature, but desirably a temperature at which the protective self-adhesive film melts, or higher, and may wary depending on the kind of the protective self-adhesive film, generally 100° to 250° C., preferably 130° to 200° C. When the heating temperature is lower than 100° C., cutting out of the protective self-adhesive film becomes difficult. When higher than 250° C., cut portion of the film may stick onto the cutting blade, the washer nozzle, etc., resulting in being difficult to be removed.

The present invention makes it possible to provide a process for applying a protective self-adhesive film onto a coat-finished product having an object unnecessary to be protected by the protective self-adhesive film, which process is capable of removing an unnecessary portion of the protective self-adhesive film over an area occupied by the object unnecessary to be protected by the protective self-adhesive film without making cuts onto the coating of the coat-finished product on cutting out the unnecessary portion of the protective self-adhesive film, capable of greatly reducing the working time to remove the unnecessary portion of the protective self-adhesive film, and capable of preventing pollutants from contacting with the coating of the coat-finished product to effectively protect the coating of the coat-finished product with good durability.

What is claimed is:

1. A process for applying a protective self-adhesive film onto a coat-finished product having an object unnecessary to be protected by the protective self-adhesive film, which process comprises the following steps: applying a perforated self-adhesive film (a) having a perforation onto the surface of the coating of the coat-finished product so that an area occupied by the object unnecessary to be protected may be positioned within the perforation, applying a protective self-adhesive film onto the object, the perforated self-adhesive film (a) and such a part of the coating of the coat-finished product as not to be covered with the perforated self-adhesive film (a), and removing an unnecessary portion of the protective self-adhesive film over the perforation.

2. A process for applying a protective self-adhesive film onto a coat-finished product having an object unnecessary to be protected by the protective self-adhesive film, which process comprises the following steps: applying the protective self-adhesive film onto the object and a coating of the coat-finished product, cutting out such an unnecessary portion of the protective self-adhesive film as positioned over the area occupied by the object by use of a cylindrical cutting device comprising a ring-shaped cutter blade and a cylindrical pressing means to press and adhere the remaining portion of the protective self-adhesive film around the object onto the coating of the coat-finished product, and removing the cut unnecessary portion of the protective self-adhesive film by suction.

3. A process as claimed in claim 2, wherein the cylindrical cutting device further comprises a ribbon heater to heat the cutter blade to a predetermined temperature.

4. A process as claimed in claim 1 or 2, wherein the coat-finished product is an automobile bonnet having two projecting washer nozzles as the object unnecessary to be protected.

* * * * *